United States Patent [19]

Aiken et al.

[11] 4,277,453

[45] Jul. 7, 1981

[54] WASTE GAS PURIFICATION REACTOR AND METHOD

[75] Inventors: John E. Aiken, Monroeville Boro; William J. Didycz, Whitehall Boro, both of Pa.

[73] Assignee: United States Steel Corporation, Pittsburgh, Pa.

[21] Appl. No.: 44,895

[22] Filed: Jun. 4, 1979

[51] Int. Cl.$^3$ .............................................. B01D 53/36
[52] U.S. Cl. ................................. 423/247; 423/210; 423/245; 55/80; 55/82; 55/84; 55/267; 55/269; 260/346.76; 562/595
[58] Field of Search ............... 423/210 S, 247, 245 S; 55/80, 82, 84, 85, 267, 269; 159/49; 260/346.76; 562/593, 595

[56] References Cited

U.S. PATENT DOCUMENTS

| | | | |
|---|---|---|---|
| 661,944 | 11/1900 | Belden | 62/289 |
| 1,770,020 | 7/1930 | Taylor | 55/269 |
| 1,941,365 | 12/1933 | Patterson et al. | 165/1 |
| 2,098,047 | 11/1937 | Jaeger et al. | 562/595 |
| 2,389,850 | 11/1945 | Gunter | 165/1 |
| 2,499,358 | 3/1950 | Cooper et al. | 165/7 |
| 2,521,866 | 9/1950 | Ott | 126/110 |
| 3,231,015 | 1/1966 | Koch | 165/134 |
| 3,373,544 | 3/1968 | Catlin et al. | 55/269 |
| 3,609,943 | 10/1971 | Richter | 55/82 |
| 3,725,532 | 4/1973 | Fernandes et al. | 423/245 S |
| 3,819,333 | 6/1974 | Brand et al. | 422/244 |
| 3,965,126 | 6/1976 | Wirth et al. | 260/346.76 |
| 4,015,562 | 4/1977 | Yousoufian | 122/483 |
| 4,096,909 | 6/1978 | Jukkola | 165/76 |

FOREIGN PATENT DOCUMENTS

| | | | |
|---|---|---|---|
| 51-21570 | 8/1974 | Japan | 423/245 S |
| 967904 | 8/1964 | United Kingdom | 423/210 S |

*Primary Examiner*—Earl C. Thomas
*Attorney, Agent, or Firm*—W. Gary Goodson

[57] ABSTRACT

Device and method for removing dissolved organic acids from entrained liquid droplets in a waste gas stream comprising (1) heating the liquid droplets in the waste gas stream to the vaporization temperature, and (2) contacting the waste gas stream with a collecting means whereby the dissolved organic acids are deposited on the means of evaporization of the liquid droplets to thereby produce the heated gas stream substantially free of the liquid droplets. Additionally, the invention preferably relates to a reactor and method additionally comprising the steps of (1) introducing the waste gas stream having the dissolved organic acids removed through an inlet into a chamber containing a catalyst bed for oxidizing the pollutants, (2) passing the waste gas stream through a distributor plate containing a multiplicity of holes located between the inlet and the catalyst bed in a manner such that the waste gas is substantially uniformly distributed over the catalyst bed, (3) passing the waste gas through the catalyst bed while maintaining the catalyst bed at a temperature sufficient to sustain catalytic oxidation of the oxidizable pollutants, and (4) withdrawing through an outlet of the chamber the waste gas stream which has passed through the catalyst bed. Additionally, it is preferred that the method includes the step of removing the deposited organic acids from the above mentioned collecting means. The collecting means is preferably in the form of a thin fin parallel tube heat exchanger.

12 Claims, 3 Drawing Figures

WASTE GAS PURIFICATION REACTOR AND METHOD

BACKGROUND OF THE INVENTION

1. Field of the Invention

This invention relates to air pollution control. More specifically, the invention is directed to a device for removing dissolved organic acids from entrained liquid droplets in a waste gas stream. In another aspect, the invention is directed to a reactor and method for insuring oxidation of oxidizable materials in waste gas streams, and particularly by means of a waste gas purifier such as a catalytic oxidation unit.

2. Description of the Prior Art

Considerable effort has gone into removing harmful materials present in waste gas streams such as would be present in industrial plants such as those waste gases produced in the production of maleic anhydride. Catalytic oxidation units have successfully been developed for oxidizing pollutants such as hydrocarbons and carbon monoxide. However, the presence of entrained liquid droplets containing dissolved organic acids have caused certain problems with such catalytic oxidation units. If the catalytic oxidation unit is constructed with inexpensive carbon steel rather than stainless steel, serious corrosion problems result. Also, over prolonged periods, deposition of the organic acids on the catalyst bed results in masking of the catalyst with resulting decreased efficiency of the catalyst bed. Ultimately, this masking of the catalyst results in decreased catalyst life. With the very expensive catalysts used in such beds, this can present a very serious economic problem.

SUMMARY OF THE INVENTION

The apparatus and process of this invention relate to a method for removing dissolved organic acids from entrained liquid droplets in a waste gas stream comprising (1) heating the liquid droplets in the waste gas stream to the vaporization temperature, and (2) contacting the waste gas stream with a collecting means such as a fin tube heat exchanger whereby the dissolved organic acids are deposited on the collecting means upon evaporation of the liquid droplets to thereby produce a heated gas stream substantially free of the liquid droplets. More preferably, the invention relates to a method for removing oxidizable pollutants from a waste gas stream from a maleic anhydride production facility comprising (1) contacting the waste gas stream containing maleic anhydride vapor and other oxidizable pollutants with a scrubbing liquid to remove the maleic anhydride but leaving minor amounts of the organic acid dissolved in droplets of the scrubbing liquid suspended in the waste gas stream, (2) contacting the waste gas stream with a plurality of closely spaced thin fin heating elements to heat the scrubbed gas stream until the scrubbing liquid evaporates from the droplets and deposits the dissolved solids on the plurality of thin fin heating elements, (3) introducing the waste gas stream having the entrained droplets and dissolved solids removed from an inlet into a chamber containing a catalyst bed for oxidizing the pollutants, (4) passing the waste gas stream through a distributor plate containing a multiplicity of holes located between the inlet and the catalyst bed in a manner such that the waste gas stream is substantially uniformly distributed over the catalyst bed, (5) passing the waste gas stream through the catalyst bed while maintaining the catalyst bed at a temperature sufficient to sustain catalytic oxidation of the oxidizable pollutants, and (6) withdrawing through an outlet of the chamber the waste gas stream which has passed through the catalyst bed.

The invention described effectively eliminates the corrosion problems on carbon steel and the masking problem for the catalyst bed. Therefore, the catalytic oxidation unit can be constructed with less expensive materials, i.e. carbon steel, and the life of the catalyst is prolonged, thus resulting in both lower capital costs and lower operating costs for the catalytic oxidation unit.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
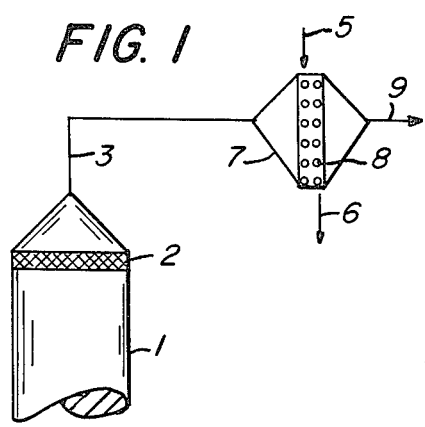
FIG. 1 is a schematic representation of the device for removing dissolved organic acids from entrained liquid droplets in waste gas streams.

The collecting means of this invention is preferably in the form of an extended surface heat exchanger and especially one made up of a plurality of parallel tubes. Preferably, the heat is provided for the collecting means by means of steam. More preferably, the collecting means is in the form of a plurality of thin fin heating elements and especially fins attached to a tube heat exchanger. Preferably, each of the parallel tubes is oriented in a substantially horizontal direction. Generally, the parallel tubes are of a substantially uniform spacing and are preferably spaced between about 2 and about 10 inches apart. The tubes preferably have an average diameter of between about ½ and about 4 inches.

The fins on the collecting means preferably have a height between about ½ to about 2 inches. They are preferably serrated and attached to the tube in a circumferential direction around the tube. In a preferred embodiment, the fins are serrated and form a spiral around the tube type heat exchanger.

The liquid of the entrained liquid droplets of this invention is preferably water. The organic acid dissolved in the entrained liquid droplets is preferably maleic acid. In a preferred system, the maleic acid is present in the liquid droplet in an amount between about 0.1 and about 5 percent of the total weight of the droplet.

The waste gas stream containing the entrained liquid droplets is preferably heated to a temperature between about 50° and 200° C. More preferably, this range is between about 60° and about 160° C. In a preferred embodiment, during start-up of the catalytic oxidation unit the thin fin heat exchanger heats the waste gas stream up to about 160° C. After start-up, a second heat exchanger using the heat from the catalytic oxidation unit starts working. Therefore, the thin fin heat exchanger only has to heat the waste gas stream to about 60°–70° C., and the supplementary heat exchanger heats the waste gas stream the rest of the way up to 160° C.

The waste gas stream of this invention may be any of those containing impurities which may be removed by a waste gas catalytic oxidation unit. However, the invention is particularly directed to those waste gas streams containing oxidizable pollutants such as hydrocarbons and carbon monoxide. Exemplary hydrocarbons found in the preferred waste gas streams are benzene, maleic acid, formic acid, and formaldehyde. One exemplary waste gas stream contains the following amounts of impurities in pounds per hour per 200,000 pounds per hour of waste gas: benzene—117, maleic acid—21, formic acid—17, formaldehyde—75, and carbon monoxide—3340.

In general, the class of pollutants may be those selected from the group $C_1$–$C_{12}$ aliphatic and aromatic hydrocarbons and partially oxygenated $C_1$–$C_{12}$ aliphatic and aromatic hydrocarbons.

A preferred waste gas stream comprises nitrogen, oxygen, carbon monoxide, carbon dioxide, and water vapor, and most preferably one wherein the nitrogen is present in said waste gas stream in an amount between about 76 and about 80 percent by volume, the oxygen is present in an amount between about 10 and about 15 percent by volume, the water vapor is present in an amount between about 5 and about 15 percent by volume, the carbon monoxide is present in an amount between about 1 and about 3 percent by volume, and the carbon dioxide is present in an amount between about 2 and about 8 percent by volume.

The waste gas purification unit of this invention is preferably a catalytic oxidation unit, and more preferably, one wherein the catalyst comprises oxides of manganese and copper. An especially preferred catalyst is a hopcalite catalyst. It is important to maintain temperature of the catalyst during use between about 120° C. and about 600° C., and preferably between about 125° C. and about 540° C. The temperature rise from the inlet to the outlet sides of the catalyst bed is preferably between about 150° C. and about 300° C.

The catalyst bed is preferably made up of catalyst granules and has a thickness of between about 1 to 8 inches and more preferably between about 3 to 8 inches. The catalyst granules preferably have an average diameter of between about 1 and about 4 millimeters. The term granule includes pellets, particles and the like. The pressure drop from the inlet to the outlet of the catalyst bed may be between about 1 inch to about 10 inches of water; and the combined pressure drop over the distributor plate and the catalyst bed will generally be between about 2 inches and about 11 inches.

The preferred distance between the outlet side of the distributor plate and the inlet side of the catalyst bed is between about 18 inches and about 5 feet.

The velocity of the waste gas stream at the face of the catalyst bed is preferably between about 60 and about 140 feet per minute.

In FIG. 1 a waste gas stream containing organic acid anhydride vapors such as maleic anhydride and other oxidizable pollutants enter scrubber 1 wherein the waste gas stream is contacted with a scrubbing liquid such as water to remove the organic acid anhydride, but in the process leaving minor amounts of the organic acid dissolved in droplets of the scrubbing liquid suspended in the waste gas stream. A conventional demister 2 such as a wire mesh demister removes a certain percentage of the suspended liquid droplets. The waste gas stream from the demister 2 passes through line 3 to device 7 for removing dissolved solids from the entrained droplets in the waste gas stream. Steam from line 5 provides heat for heating collecting means 8, preferably in the form of thin fin heating element which heats the suspended liquid droplets to evaporate the liquid and the dissolved solids depositing in solid form on the collecting means 8. The waste gas stream having the entrained droplets and dissolved solids removed passes from the chamber of device 7 through line 9 and onto a catalytic oxidation unit or the like to remove the oxidizable pollutants remaining in the waste gas stream.

Figure 2:
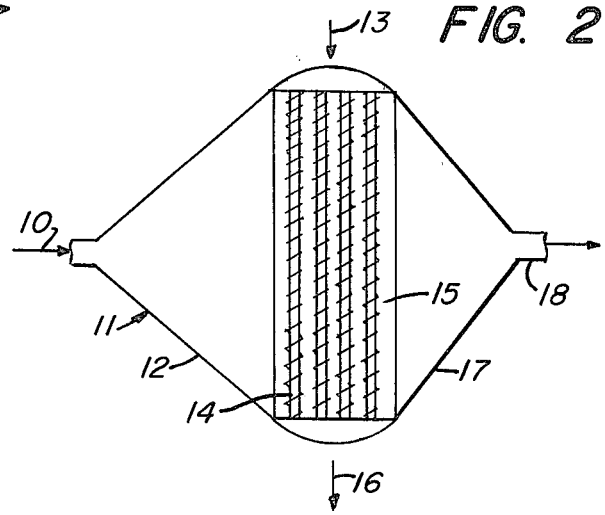
FIG. 2 is a schematic representation of a top view of a preferred fin tube heat exchanger for removing dissolved organic acids from entrained liquid droplets in waste gas streams.

In FIG. 2 an expanded version of the device for removing the liquid droplets from the waste gas stream is shown. The waste gas stream 10 passes into the device 11 having chamber walls 12, preferably of stainless steel to prevent corrosion from the acid-containing liquid droplets. The waste gas stream then passes through collecting means 14 for heating the liquid droplets in the waste gas stream to the vaporization temperature of the liquid to thereby cause deposition on the collecting means 14 of dissolved solids from the liquid droplets. As shown, the collecting means 14 are in the form of horizontally oriented parallel thin fin tubes having spiral fins 15. The heated waste gas stream free of entrained droplets is passed through the other side of device 11 in contact with chamber walls 17, preferably made of the cheaper carbon steel since the waste gas stream now no longer causes the corrosion problem that it did prior to passing through collecting means 14. The waste gas stream then passes out line 18 onto a catalytic oxidation unit or the like for removal of oxidizable pollutants still remaining in the waste gas stream. Steam passes through the collecting means 14 from line 13. Condensate from the steam passes out line 16.

Figure 3:
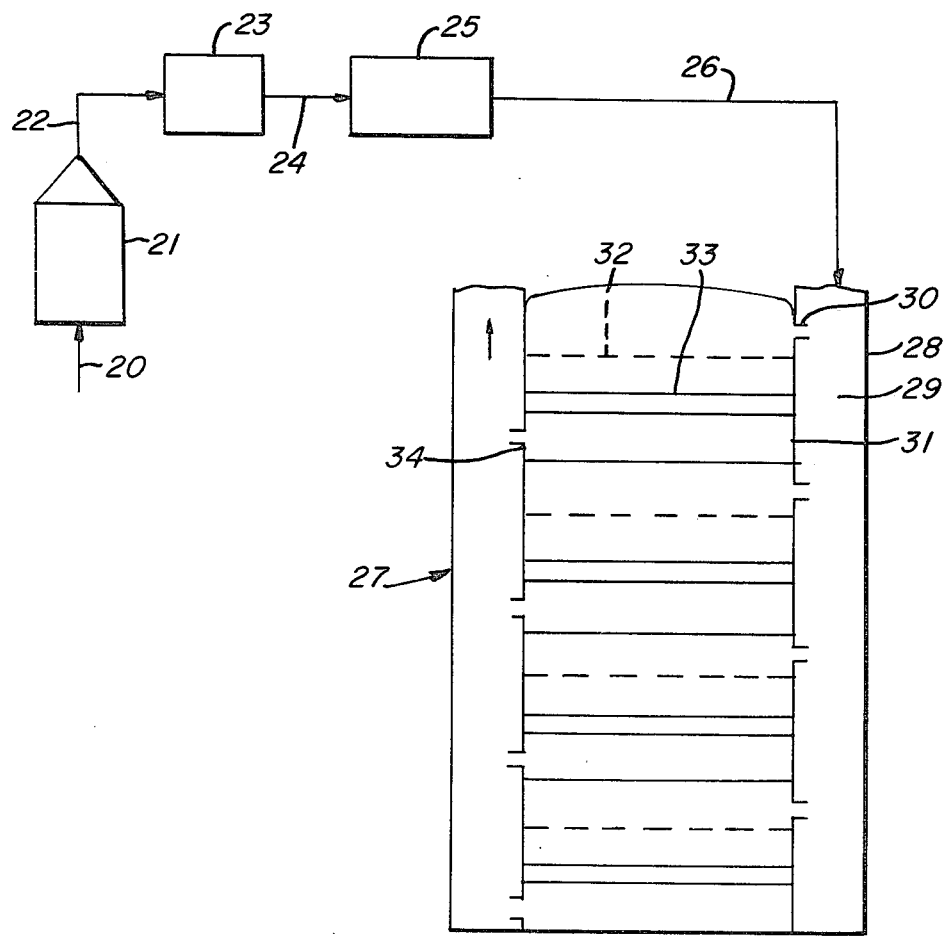
FIG. 3 is a schematic representation of a preferred waste gas purification reactor and method including a plurality of catalyst beds and corresponding distributor plates.

FIG. 3 represents a preferred embodiment of the invention wherein a waste gas stream at entrance 20 containing maleic anhydride vapors and other oxidizable pollutants enter scrubber 21 where the waste gas stream is contacted with scrubbing liquid to remove the maleic anhydride, but leaving minor amounts of maleic acid dissolved in droplets of the scrubbing liquid suspended in the waste gas stream. The waste gas stream then passes through line 22 to device 23 for contacting the waste gas stream with a plurality of closely spaced thin fin heating elements to heat the scrubbed gas stream until the scrubbing liquid evaporates from the droplets and deposits the dissolved solids on the plurality of thin fin heating elements. The heated waste gas stream free of entrained droplets and dissolved solids then passes through line 24 to extra heat exchanger 25 which preferably obtains its heat from catalytic oxidation unit 27 after such unit has started up. The preheated gas stream from 25 leaves through line 26 and passes into catalytic oxidation unit 27 which comprises a plurality of horizontal, parallel catalyst beds with corresponding distributor plates. The outer reactor wall 28 helps provide means 29 for allowing the waste gas stream to communicate with different inlets 30 of the chambers 31 containing distributor plates 32 and corresponding catalyst beds 33. The waste gas stream containing the oxidizable impurities enters the catalytic oxidation unit 27 through inlet 30 of chamber 31. The gas stream then passes through distributor plate 32 where it undergoes a pressure drop sufficient to cause the gas stream to be substantially uniformly distributed over the catalyst bed, and wherein the distributor plate openings create in the plate surface a total open area of less than about 10 percent. The gas stream then passes through catalyst bed 33 and then leaves through outlet 34.

By way of example, a system such as described in FIG. 2 is used to practice the invention. The waste gas stream containing entrained liquid droplets enters the device 11 at a temperature of 110° F., 21,000 cfm at a pressure of 15.9 psia, 8.0 volume percent $H_2O$, 1417 pounds per hour of entrained water containing 2.64 pounds per hour maleic acid and 5.44 pounds per hour of formic acid. The collecting means 14 are in the form of a plurality of thin fin tube heat exchangers having spiral, serrated fins and tubes of a length of 9 feet, a 2 inch diameter and the tubes being essentially parallel and spaced a distance of 3-11/16 inches apart. The collecting means are in the form of four rows of horizontal, parallel tubes with 28 tubes in each row. When the system such as described in FIG. 3 is starting up using this device, the collecting means are used to heat up the waste gas stream to about 160° C., but after a second heat exchanger starts working using the heat from the catalytic oxidation unit, then the thin fin heat exchanger only heats the waste gas stream up to about 60° C. The waste gas stream leaving the device 11 of FIG. 2 contains about 10.5 volume percent $H_2O$, but essentially no water droplets and essentially no maleic acid or formic acid.

The waste gas stream leaving the device 11 from FIG. 2 does not cause any significant corrosion problems, and therefore, steel used for the chamber walls 17 of device 11 is made out of cheaper carbon steel. Additionally, since the organic acids are essentially completely removed from the waste gas stream, problems of masking of the catalyst bed in a subsequent catalytic oxidation unit are eliminated.

We claim:

1. Process for removing oxidizable pollutants from a waste gas stream comprising:
    (1) removing dissolved organic acids from liquid droplets entrained in said waste gas stream by (a) heating said droplets to evaporate the liquid of said droplet and (b) contacting said waste gas stream with means for collecting said dissolved organic acids upon evaporation of the liquid of said droplets,
    (2) introducing said waste gas stream having said dissolved organic acids removed, through an inlet into a chamber containing a catalyst bed for oxidizing said pollutants,
    (3) passing said waste gas stream through a distributor plate containing a multiplicity of holes located between said inlet and said catalyst bed in a manner such that said waste gas is substantially uniformly distributed over said catalyst bed,
    (4) passing said waste gas through said catalyst bed while maintaining said catalyst bed at a temperature sufficient to sustain catalytic oxidation of said oxidizable pollutants, and
    (5) withdrawing through an outlet of said chamber said waste gas stream which has passed through said catalyst bed.

2. Process as in claim 1 wherein said dissolved organic acids comprise maleic acid and wherein said liquid comprises water.

3. Process as in claim 2 additionally comprising the step of removing the deposited organic acids from said means for collecting said dissolved solids.

4. Process as in claim 2 wherein said waste gas stream comprises nitrogen, oxygen, carbon monoxide, carbon dioxide, and water vapor.

5. Process as in claim 4 wherein said nitrogen is present in said waste gas stream in an amount between about 76 and about 80 percent by volume, said oxygen is present in an amount between about 10 and about 15 percent by volume, said carbon monoxide is present in an amount between about 1 and about 3 percent by volume, said carbon dioxide is present in an amount between about 2 and about 8 percent by volume, said water vapor is present in an amount between about 3 and about 9 percent by volume, and said liquid droplets are present in an amount up to about 5 percent by weight.

6. Process as in claim 5 wherein said maleic acid is present in said liquid droplets in an amount between about 0.1 and about 5 percent by weight of the total weight of said droplets.

7. Process for removing oxidizable pollutants from a waste gas stream from a maleic anhydride production facility comprising:
    (1) contacting said waste gas stream containing minor amounts of maleic anhydride and other oxidizable pollutants with a scrubbing liquid to remove said maleic anhydride but leaving minor amounts of maleic acid in droplets of said scrubbing liquid suspended in said waste gas stream,
    (2) contacting said waste gas stream with a plurality of closely spaced thin fin heating elements to heat the scrubbed gas stream until said scrubbing liquid evaporates from said droplets and deposits the dissolved maleic acid on said plurality of thin fin heating elements,
    (3) introducing said waste gas stream having said entrained droplets and dissolved maleic acid removed through an inlet into a chamber containing a catalyst bed for oxidizing said pollutants,
    (4) passing said waste gas stream through a distributor plate containing a multiplicity of holes located between said inlet and said catalyst bed in a manner such that said waste gas is substantially uniformly distributed over said catalyst bed,
    (5) passing said waste gas through said catalyst bed while maintaining said catalyst bed at a temperature sufficient to sustain catalytic oxidation of said oxidizable pollutants, and
    (6) withdrawing through an outlet of said chamber said waste gas stream which has passed through said catalyst bed.

8. Process as in claim 7 additionally comprising the step of removing the deposited maleic acid from said plurality of thin fin heating elements.

9. Process as in claim 7 additionally comprising contacting said waste gas stream from step (1) with a conventional demister to remove some of said entrained droplets from said waste gas stream prior to contacting said waste gas stream with said plurality of thin fin heating elements.

10. Process as in claim 9 wherein said plurality of thin fin heating elements comprise a fin tube heat exchanger.

11. Process as in claim 10 wherein said plurality of thin fin heating elements are in the form of a multiplicity of parallel tubes which are heated by steam through the inside of said tubes.

12. Process as in claim 11 wherein said tubes have an average diameter of between about ½ to about 4 inches and an average fin height of between about ⅛ to about 2 inches.

* * * * *